3,334,036
PHOTOCHEMICAL METHOD OF PRODUCING PROPYLENE EPISULPHIDE
Franklin J. Wright, Watchung, N.J., assignor to Esso Research and Engineering Company, a corporation of Delaware
No Drawing. Filed Sept. 18, 1963, Ser. No. 309,871
2 Claims. (Cl. 204—162)

The present invention relates to improved processes for preparing propylene episulphide (thiocyclopropane), the utility of which is well known as a monomer for polymerization and as a chemical intermediate, e.g. U.S. 2,891,072, from relatively inexpensive feed stocks. More particularly, this invention relates to reacting propylene with carbonyl sulphide (COS) or carbon disulphide ($CS_2$) in the presence of ultraviolet or other radiation, e.g. X- or gamma rays, to obtain propylene episulphide. More particularly, in a preferred embodiment, this invention relates to reacting a gaseous mixture of propylene and COS or $CS_2$, at temperatures of 0 to 200° C., in the presence of ultraviolet light, utilizing mol ratios of propylene to COS or $CS_2$ of about 100:1 to about 0.1:1.

In the practice of this invention, the propylene may be reacted with any compound which releases sulphur atoms upon irradiation. Because this is a vapor phase reaction, however, the compound must have a sufficiently high vapor pressure, e.g. above about 10 mm. Hg. Suitable compounds which can serve as a source of sulphur atoms are COS, $CS_2$, $H_2S_2$, $H_2S_3$, and organic tetrasulphides such as ethyl tetrasulphide and phenyl tetrasulphide. The preferred compounds are COS and $CS_2$.

Suitable reaction conditions are: (1) temperatures in the range of about 0° to about 200° C., preferably about 0° to about 100° C., e.g. 15° C., (2) pressures in the range of about .01 to about 100 atmospheres, preferably about .01 to about 10 atmospheres, e.g. 1 atmosphere, (3) reaction times in the range of about 1 minute to about 10 hours, preferably about 10 minutes to about 1 hour, e.g. 1 hour (4) mol ratios of propylene to COS or $CS_2$ of about 100:1 to about 0.1:1, preferably about 20:1 to about 1:1, e.g. 10:1, (5) light intensities of about $10^{12}$ quanta/cm.$^2$/sec. to about $10^{20}$ quanta/cm.$^2$/sec. and (6) wavelength of radiation of about 1600 A. to about 2700 A., preferably about 2000 A. to about 2550 A., e.g. 2290 to 2550 A.

The present invention will be more clearly understood from the following specific example, which is included for illustrative purposes and not as a limitation.

*Example*

A gaseous mixture carbonyl sulphide and propylene, in a molar ratio of 1:10, was irradiated in a 1 liter vessel at a thermostatically controlled temperature of 15° C. The source of the ultraviolet radiation was a 100-watt Hanovia lamp, and the wavelength of the radiation extended from the visible to about 2100 A. The total pressure in the vessel was about 1 atmosphere. The vessel was fitted with a double wall water-cooled quartz well into which the lamp was placed.

The rate of episulphide formation, which is dependent upon the intensity of the radiation source, was 0.55 $\mu$-mol/minute. The reaction products were frozen out in a trap maintained at —10° C. The liquid collected in this manner had a light straw color; analysis by gas chromatography showed that it was essentially all propylene sulphide. Further purification yielded a colorless liquid boiling at 77° C.

By gas chromatography, the irradiated reaction mixture, was found to contain unconverted propylene and carbonyl sulphide as well as carbon monoxide and propylene sulphide. No other products were found. The cyclic sulphide was identified by comparison of the retention volume, infra-red and mass spectra with those of an authentic sample.

Having now described and illustrated the invention, what is desired to be secured by Letters Patent is defined in the accompanying claims.

What is claimed is:
1. A process for producing propylene episulphide which consists of subjecting to ultraviolet radiation a gaseous mixture of propylene and a compound selected from the group consisting of carbonyl sulphide and carbon disulphide.
2. The process of claim 1 wherein the compound in mixture with propylene is carbonyl sulphide.

No references cited.

JOHN H. MACK, *Primary Examiner.*
H. S. WILLIAMS, *Examiner.*